United States Patent [19]

van den Woldenberg

[11] Patent Number: 5,298,123
[45] Date of Patent: Mar. 29, 1994

[54] MEASURING AND INDICATING DEVICE

[75] Inventor: Richard van den Woldenberg, Bachhagel, Fed. Rep. of Germany

[73] Assignee: J.M. Voith GmbH, Heidenheim, Fed. Rep. of Germany

[21] Appl. No.: 930,398

[22] PCT Filed: Jan. 31, 1992

[86] PCT No.: PCT/EP92/00209

§ 371 Date: Sep. 8, 1992

§ 102(e) Date: Sep. 8, 1992

[30] Foreign Application Priority Data

Feb. 4, 1991 [DE] Fed. Rep. of Germany ... 9101229[U]

[51] Int. Cl.$^5$ .............................................. D21F 1/06
[52] U.S. Cl. .................................. 162/259; 162/262; 162/344; 162/347; 324/207.16
[58] Field of Search ............... 162/259, 262, 344, 347, 162/263; 73/768; 324/207.16, 207.24

[56] References Cited

U.S. PATENT DOCUMENTS

| | | | |
|---|---|---|---|
| 3,463,701 | 8/1969 | Curtis | 162/347 |
| 4,342,619 | 8/1982 | Gladh | |
| 4,770,744 | 9/1988 | Dove | 162/259 |
| 4,783,241 | 11/1988 | Egelhof et al. | 162/347 |
| 4,892,623 | 1/1990 | Reed | 162/344 |
| 5,096,542 | 3/1992 | Dove | 162/259 |

FOREIGN PATENT DOCUMENTS

| | | |
|---|---|---|
| 0232022 | 1/1987 | European Pat. Off. |
| 0290367 | 4/1988 | European Pat. Off. |
| 3532715A1 | 3/1987 | Fed. Rep. of Germany |

OTHER PUBLICATIONS

Voith Brochure P2503, Mar. 1982.

Primary Examiner—Karen M. Hastings
Attorney, Agent, or Firm—Baker & Daniels

[57] ABSTRACT

A measuring and indicating apparatus for the position of a headbox profile bar relative to a measuring reference as an electrical signal emitter and an indicating device. Disposed in a measuring housing are the stationary part, e.g., a measuring coil, of the electrical signal emitter and a measuring element which is movable along a longitudinal axis. The indicating device comprises an indicator housing and a probe element which is movable along a longitudinal axis. The measuring housing of the electrical signal emitter has in the area of its longitudinal axis two connecting fixtures for a rigid, but adjustable connection each, for one to the indicator housing, and for another, to the measuring reference.

15 Claims, 2 Drawing Sheets

MEASURING AND INDICATING DEVICE

BACKGROUND OF THE INVENTION

The invention concerns a measuring and indicating device for the position of a movable component relative to a measuring reference, and, more particularly, a measuring and indicating device for the position of a movable component relative to a measuring reference for the position of a slot defining the outlet gap of a paper machine headbox, or for a pertaining slot adjustment spindle, with an electrical signal emitter and an indicating device. Such a measuring and indicating device is used, for example, in a paper machine headbox for measuring the position of a slat defining the paper stock outlet gap or the position of a pertaining slat adjustment spindle. As is known, the said slat extends along the outlet gap across the entire machine width and is locally deformable for purposes of local fine adjustment of the outlet gap clearance. Provided for that purpose are numerous slat adjustment spindles arranged distributed across the machine width, which can be actuated individually or in groups. The deformation of the slat (at a specific point) must take place at high precision in very small steps, which normally are smaller than 1/100 mm. With the same precision, the local position of the slat (i.e., its state of deformation) must during the operation continuously be measured and indicated by means of a measuring and indicating device, on each of the adjustment spindles.

From the Voith brochure "Headboxes" (No. p 2503) it is known that on each of the movable adjustment spindles there is an electrical signal emitter arranged (called "path pickup" there) which measures the position of the spindle relative to a measuring reference. The latter is there for instance a so-called upper lip beam. Additionally, a mechanical indicating device is connected with the spindle. The electrical signal emitter serves the remote indication of the spindle position, and thus of the local position of the said slat (defining the paper stock outlet gap) fashioned preferably as a ruler-shaped profile bar. If required, the electrical signal emitter may also serve the transmission of the measured values to a process control system. The additionally present mechanical indicating device serves the reading of the position directly on the machine.

The presence of two measuring devices on each adjustment spindle has the advantage that the electrically measured data can be checked at any time by the preferably mechanical indicating device, and that the headbox—also in the event of a failure of the electrical measurement—can continue to be operated with the aid of the mechanical indicating device.

Difficulties, however, poses the safe installation of the two measuring devices in a way such that the measured values show a maximally exact agreement. In this respect, an improvement is sought by the invention.

SUMMARY OF THE INVENTION

The present invention provides a measuring and indicating device having a measuring housing of an electrical signal emitter with two hook-up fixtures in the area of the longitudinal axis of the measuring housing for a rigid but adjustable connection to both an indicator housing and a measuring reference. Disposed within the measuring housing is a movable measuring element movable along a longitudinal axis of a the measuring housing. An indicating device includes an indicator housing and a movable probe element movable along a longitudinal axis. The movable measuring element and the movable probe element are rigidly connected with each other.

Essential is that the measuring housing of the electrical signal emitter features on its two ends a fixture for a rigid but adjustable connection and that the movable measuring element of the electrical signal emitter and the movable probe element of the indicating device are rigidly (for instance positively) connected with each other or are combined to a single-piece element. This makes it possible to position the measuring housing of the electrical signal emitter and the so-called indicator housing of the indicating device already during the manufacture of the measuring and indicating device, relative to each other, in such a way that for instance the zero positions of the two devices are in exact agreement with each other. This is accomplished as follows: To begin with, the movable measuring element of the electrical signal emitter is coupled to the movable probe element of the indicating device (making their relative positions to each other invariable). Next, the movable measuring element is in the pertaining measuring housing brought in that position in which the electrical signal emitter displays a predetermined value (for instance zero). Now, it is made certain by mutual adjustment, that is, by axial displacement of the measuring housing relative to the indicator housing, that also the indicating device displays the predetermined value. In this state, the two housings are rigidly coupled to one another, namely by fixing the said rigid but adjustable connection. From now on, not only the two movable measuring elements but also the two housings remain in an invariable mutual position.

Besides, the entire measuring and indicating device can now be adjusted and thereafter clamped in the final position, at installation on site, with the aid of the second connecting fixture provided on the measuring housing, relative to the respective measuring reference. The indicating device serves in the process to locate the exact position of the entire measuring and indicating device. Thus, the relative position of the two housings adjusted at manufacture remains entirely unaffected in this procedure. This is true also for any readjustment of the measuring and indicating device at the installation site that may later be required, if the movable component (for example the aforementioned slat or profile bar of a headbox) needs to be exchanged. Should it be necessary to exchange on one of the numerous adjustment spindles the measuring and indicating device for another, due to a failure, this can be performed within a short time during the operation.

BRIEF DESCRIPTION OF THE DRAWING

An embodiment of the invention will hereafter be described with the aid of the accompanying drawing, in which.

DETAILED DESCRIPTION OF THE INVENTION

Figure 1:
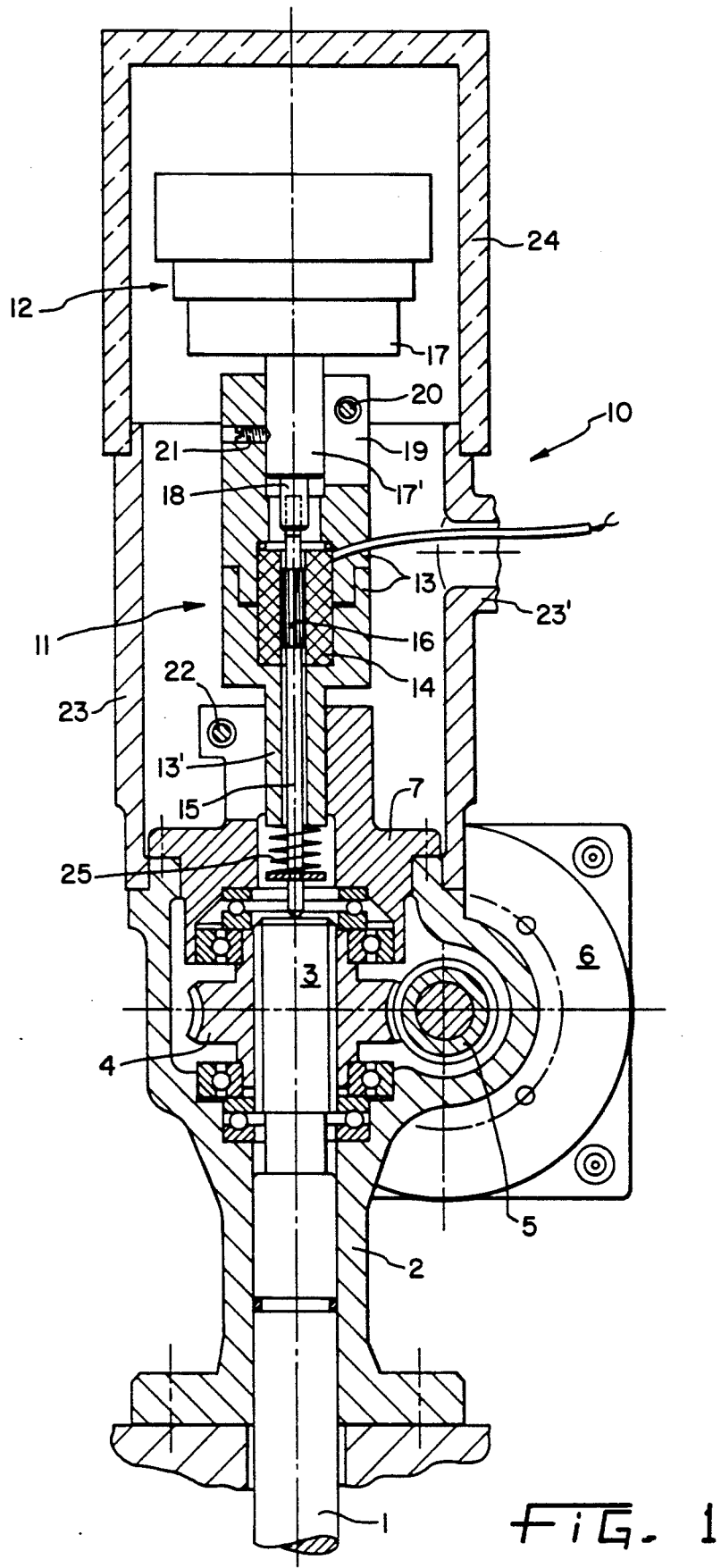
FIG. 1 shows a sectional view of a measuring and indicating device of the present invention.
Figure 2:
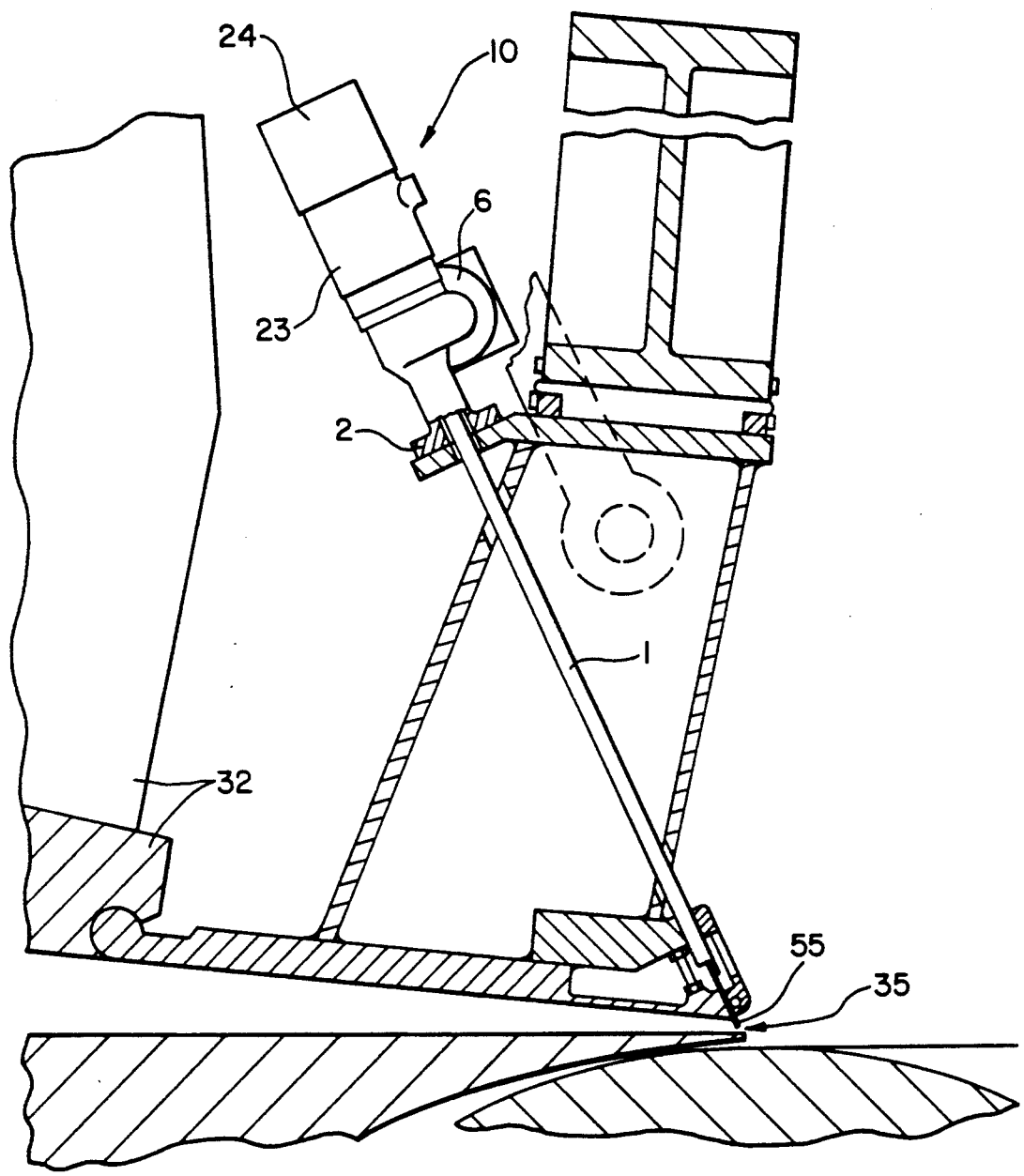
FIG. 2 shows a paper machine of conventional design having a headbox and slat, with which the measuring and indicating device of the present invention may be utilized.

The drawing shows a spindle 1 serving the local deformation of a slat or headbox profile bar 55 attached to a paper machine headbox 32 (FIG. 2). Slat 55 defines an outlet gap 35. Spindle 1 is associated with slat 55 and is movable in an axial direction in a gear housing 2. Arranged on the threaded head 3 of the spindle 1 is a worm gear 4 engaged by a worm 5. The latter is coupled to a motor 6; the worm gear 4 is rotatably mounted in the gear housing 2 but is not movable in axial direction. The gear housing 2 and pertaining housing cover 7 form with each other the so-called measuring reference.

Marked 10 overall, a measuring and indicating device is to measure and indicate the exact position of the spindle 1 relative to the measuring reference 2, 7. Serving this purpose are an electrical signal emitter 11 and a mechanical indicating device 12.

The electrical signal emitter 11 comprises a measuring housing 13 with a measuring coil 14 arranged in it and a movable rod-shaped measuring element 15 extending along the common longitudinal axis through the electrical signal emitter and featuring in the area of the measuring coil 14 a soft iron core 16.

The indicating device 12 has an indicator housing 17 with the usual scale not visible in the drawing and with a pointer (not shown) additionally a movable probe element 18 which is movable along the joint longitudinal axis.

The measuring element 15 and the probe element 18 are bolted to one another and thereby connected with each other positively and immovably. Alternatively, they could also be fashioned as a single-piece element. Another alternative might be a detachable nesting of the two elements 15 and 18 and retention in positive contact with each other by spring force.

The upper end of the measuring housing 13 is fashioned as a clamping piece 19, with a coaxial bore accommodating an extension 17' of the indicator housing 17. In other words: this split clamping piece 19 is a connecting fixture for a rigid but adjusted connection of the measuring housing 13 with the indicator housing 17. Once the correct relative position of the two housings 13 and 17 has been found, as described above, the connection is fixed by tightening a binding screw 20. Additionally, a retention screw 21 may be provided, so that the relative position of the two housings 13 and 17 will no longer be variable. This ensures that the two measuring devices provide at high accuracy always identical measured values.

In this state, the measuring and indicating device 10 is now inserted in the gear housing 2, 7 forming the measuring reference. The measuring housing has for that purpose a connection in the form of a tubular extension 13'. Furthermore, the gear cover 7 is in its upper part fashioned as a binding piece with a coaxial bore accommodating the extension 13'. Provided here is thus again a rigid, but adjustable connection, namely between the measuring housing 13 and the measuring reference 2, 7. To find the correct relative position of the measuring housing 13 in the measuring reference 2, 7, the slat (for instance profile bar) of the headbox is first aligned exactly straight across its entire length (i.e., across the machine width). Next, the measuring housings 13 are on all adjustment spindles adjusted relative to the measuring reference 2, 7 in such a way that all of the indicating devices 12 display the same value (for instance zero). Now, the connection with the measuring reference 2, 7 is fixed by tightening a binding screw 22, on each measuring housing 13.

The rod-shaped movable measuring element 15 is forced down on the upper end face 15 of the spindle head 3 by the force of a spring. The said spring may be arranged, e.g., within the indicator housing or, as indicated at 25, on the outer end of the housing extension 13'.

A sleeve 23 fastened on the gear housing 2, with a cable connection socket 23' and a transparent hood 24, serves to protect the measuring and indicating device (for instance against splash water). Conceivable is also a sleeve (not illustrated) fastened liquidtight to the measuring housing 13.

The gear housing 2, 7 must not necessarily be used as measuring reference. Instead, (according to patent application P 41 03 259.4) a tube may be provided which extends through the spindle (hollow in this case) up to the area of the headbox on the near side of the slat, and connected there rigidly with a component serving as measuring reference. The measuring element 15 extends in this case through the interior of the said tube right up to the slat.

The measuring and indicating device 10 according to the invention must not necessarily be arranged coaxial to the spindle 1. Suitable, e.g., is also an arrangement of the device 10 beside the gear housing 2 and parallel to the spindle axis.

I claim:

1. A measuring and indicating apparatus for the position of and in combination with a movable component relative to a measuring reference, the apparatus including an electrical signal emitter and an indicating device, the apparatus comprising:
    a measuring housing;
    the electrical signal emitter comprising a stationary part disposed within said measuring housing, and a movable measuring element disposed within said measuring housing and movable along a longitudinal axis;
    the indicating device comprising an indicator housing and a movable probe element which is movable along a longitudinal axis;
    said measuring housing and said indicator housing rigidly connectable to the measuring reference;
    said movable measuring element and said movable probe element rigidly connectable to said movable component;
    said measuring housing of said electrical signal emitter having two connecting fixtures in the area of the longitudinal axis of said measuring housing structured and arranged for a rigid but adjustable connection to both said indicator housing and the measuring reference, respectively;
    said movable measuring element and said movable probe elements rigidly connected with each other.

2. The measuring and indicating apparatus of claim 1, wherein said movable component is connected to a slat defining an outlet gap in a paper machine headbox.

3. The measuring and indicating apparatus of claim 2, wherein said movable component comprises an adjustment spindle for said slat.

4. The measuring and indicating apparatus of claim 1, further comprising a paper machine headbox having a slat defining an outlet gap, said measured and indicated position comprising the position of the slat.

5. The measuring and indicating apparatus of claim 1, further comprising a paper machine headbox having a slat defining an outlet gap, said movable component comprising a slat adjustment spindle associated with the slat, said measured and indicated position comprising the position of the slat adjustment spindle.

6. The measuring and indicating apparatus of claim 1, wherein said stationary part comprises a measuring coil.

7. The measuring and indicating apparatus of claim 1, wherein said indicating device includes a mechanical measured value indicator.

8. The measuring and indicating apparatus of claim 7, wherein said electrical signal emitter and said indicating device include a center zero position and positive and negative ranges connecting thereto.

9. The measuring and indicating apparatus of claim 7, wherein said measuring housing and said indicator housing are disposed coaxially to each other.

10. The measuring and indicating apparatus of claim 9, wherein said movable measuring element and said movable probe element are combined to a single-piece element.

11. The measuring and indicating apparatus of claim 1, wherein said electrical signal emitter and said indicating device include a center zero position and positive and negative ranges connecting thereto.

12. The measuring and indicating apparatus of claim 11, wherein said measuring housing and said indicator housing are disposed coaxially to each other.

13. The measuring and indicating apparatus of claim 12, wherein said movable measuring element and said movable probe element are combined to a single-piece element.

14. The measuring and indicating apparatus of claim 1, wherein said measuring housing and said indicator housing are disposed coaxially to each other.

15. The measuring and indicating apparatus of claim 14, wherein said movable measuring element and said movable probe element are combined to a single-piece element.

* * * * *